Dec. 27, 1938.  C. S. ALEXANDER  2,141,233
MANUALLY PROPELLED INERTIA VEHICLE
Filed Feb. 25, 1935  2 Sheets-Sheet 1
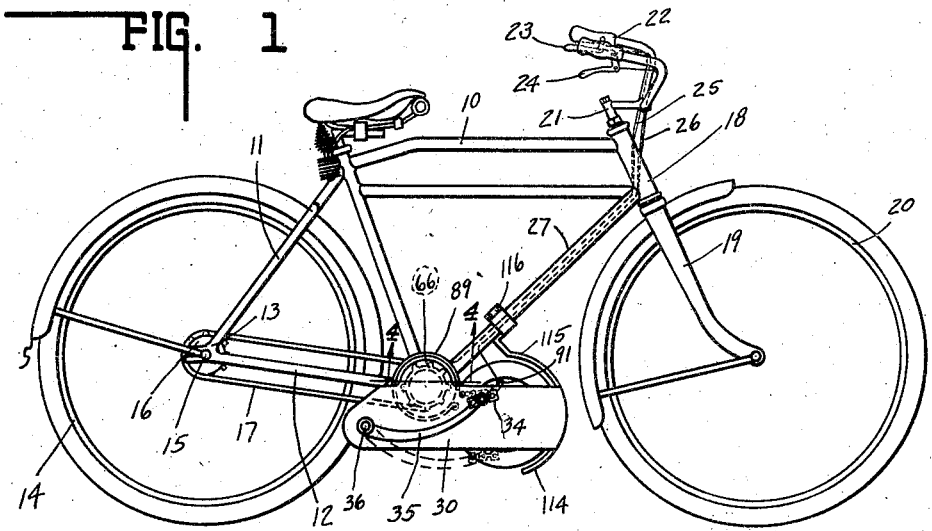
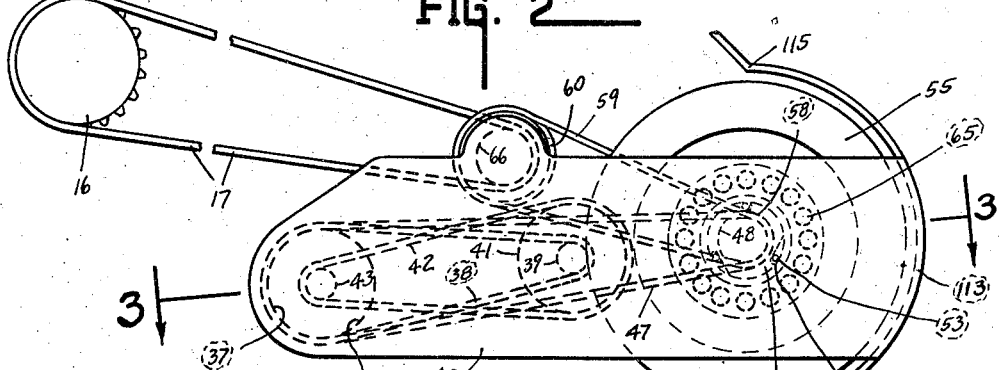
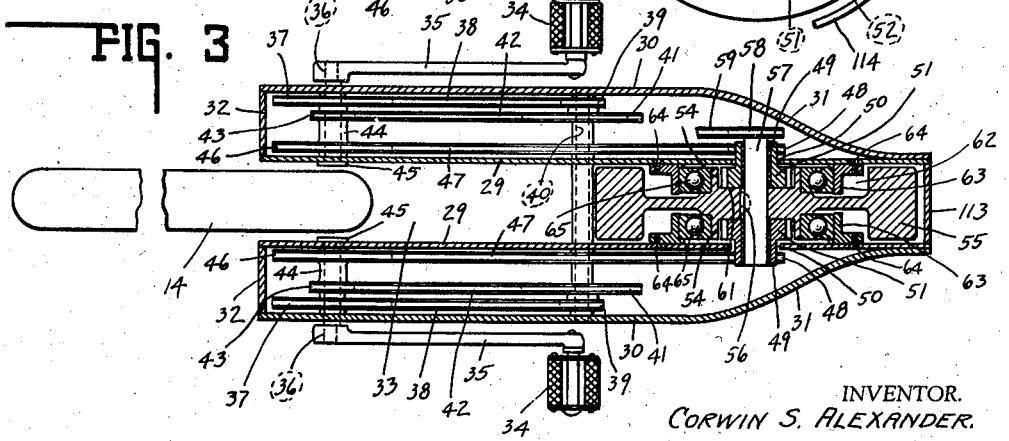
INVENTOR.
CORWIN S. ALEXANDER.
BY Lockwood Goldsmith & Galt
ATTORNEYS.

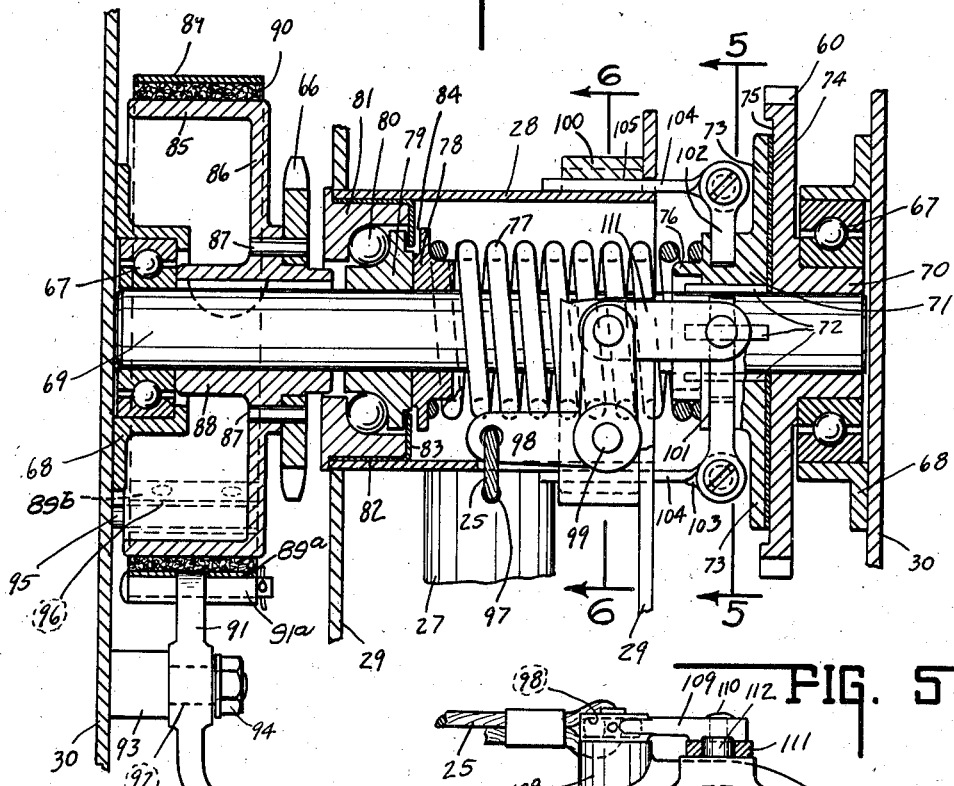

Patented Dec. 27, 1938

2,141,233

UNITED STATES PATENT OFFICE 2,141,233

MANUALLY PROPELLED INERTIA VEHICLE

Corwin S. Alexander, Indianapolis, Ind.

Application February 25, 1935, Serial No. 8,017

13 Claims. (Cl. 280—217)

This invention relates to a manually driven vehicle wherein the inertia principle is embodied.

The invention is illustrated as applied to a bicycle, although is not restricted thereto in its application, but may be applied with equal facility to a three or four wheel device.

The invention is also illustrated in its application as being adapted to transform a standard bicycle structure into a bicycle embodying the inertia principle.

The chief object of the invention is to provide a pedal operated vehicle with an inertia device, whereby the advantage of momentum acquired by the vehicle may be stored and subsequently utilized for power purposes.

Other features of the invention in addition to those hereinbefore suggested, will be set forth more fully hereinafter.

The full nature of the invention will be understood from the accompanying drawings and the following specification and claims:—

In the drawings, Fig. 1 is a substantially side elevational view, portions, however, being shown in perspective, of a bicycle with the invention applied thereto.

Fig. 2 is an enlarged side elevational view of a major portion of the attachment applied to the bicycle shown in Fig. 1.

Fig. 3 is a longitudinal sectional view taken on line 3—3 of Fig. 2.

Fig. 4 is a still further enlarged transverse sectional view of the control portion of the attachment and is taken on line 4—4 of Fig. 1 and in the direction of the arrows.

Fig. 5 is a sectional view taken on line 5—5 of Fig. 4 and in the direction of the arrows.

Fig. 6 is a sectional view taken on line 6—6 of Fig. 4 and in the direction of the arrows.

In the drawings, 10 indicates the usual bicycle frame structure having a rearwardly and downwardly directed rear wheel supporting fork 11, and a similarly longitudinally and rearwardly directed fork 12 terminating in the usual hub structure 13 supporting a rear wheel 14 which includes an axle 15 mounting the usual sprocket pinion 16 driven by the sprocket chain 17. The frame 10 terminates in the forward tubular portion 18 which rotatably supports the front wheel fork 19 supporting the front wheel 20. The handle bar structure 21 is rigid with the fork 19 in the usual manner and terminates in the handle portions 22. The left hand handle portion suitably supports a clutch control member in the form of a lever, or the like, 23 and the right hand handle portion 22 suitably supports a similar control member 24 for brake control. The two controls are connected by cables 25 and 26, respectively, to the respective clutch and brake operating members. Whenever desired, these cables may be, and as shown, enclosed within the tubular portion 27 of the frame 10.

The invention when applied as an attachment to a standard bicycle structure necessitates the removal of the usual pedal structure, the customary sprocket gear and all other associated parts enclosed within the tubular hub portion 28—see Fig. 4—of the standard frame.

Two parallel plates 29 lie approximately in the planes of the ends of the tubular portion 28. Two outer plate portions 30 are spaced therefrom and at their forward ends—see Fig. 3—extend inwardly toward each other as at 31 and are suitably secured to the plates 29, or the like. This produces a streamlining effect. The rear ends of each pair of adjacent plates 29 and 30 may be suitably secured together as at 32. This provides a well portion or space 33 within which may be positioned the forward portion of the rear wheel 14.

Since—see Fig. 3—each half of the construction is substantially similar to the opposite half, except where otherwise noted, the specific description will be directed to but one half.

34 indicates a pedal structure of conventional construction mounted by the pedal crank arm 35 keyed or otherwise suitably secured to the shaft 36, which projects through the plate 30 and is rotatably supported thereby. The enclosed portion of the shaft supports and drives a gear 37 which meshes with a chain 38 that in turn meshes with a pinion 39 rotatably supported on a shaft 40. Pinion 39 is rigid with gear 41 which, in turn, meshes with a chain 42 in turn meshing with a pinion 43 rigid with the tubular shaft 44 which is rotatably supported on the spindle 45 carried by the plate member 29. Spindle 45 and shaft 36 are herein shown integral. Rigid with the tubular shaft 44 is the gear 46 meshing with chain 47 in turn meshing with a pinion 48 rigid with a tubular shaft 49. Each half of the construction is substantially similar.

The tubular shaft 39, see Fig. 3, projects through the opening 50 in the plate 29 and terminates in a driving portion 51, see Fig. 2, of semi-ratchet type as indicated by the numeral 52. The rollers 53, see Fig. 2, associated with the toothed portions of member 51 are so arranged that they are adapted when the pedal structure is depressed to grip the inner cylindrical wall 54, see Fig. 3, of a flywheel structure 55 that is keyed as at 56 to shaft 57, see Fig. 3.

Shaft 57 is coaxial with the tubular shaft 49 and in Fig. 3, the upper end of the shaft 57 projects beyond said tubular shaft and terminates in a pinion 58 which by means of chain 59, rotates gear 60—see Figs. 2 and 4 particularly.

It will be observed that the inner cylindrical wall 54 is one wall of a well 61 formed in the hub portion of the inertia wheel. The intermediate portion of the inertia wheel at each side is also relieved or provided with an annular channel 62 and nested therein is an annular support 63 suitably secured to the adjacent plate 29 as at 64. The annular anti-friction construction 65 is interposed between the frame 29 and the inertia wheel preventing wabbling of the wheel and insuring a more firm support therefor. As shown in Fig. 3, the shaft 40 for rigidity may extend entirely through all four frame members 29 and 30.

The ratchet and roller construction, it will be apparent, form a one-way clutch. Thus, as each pedal structure is depressed from the full line position shown in Fig. 1 to approximately the dotted line position shown in the same figure, the portion 51, through the rollers engaging the inertia wheel, rotates the inertia wheel in the same direction. As each pedal structure or both simultaneously are depressed, the wheel will be given a forward impulse and if alternately depressed, a continuous impulse may be imparted thereto. In this manner, while the wheel 14 is stationary, the inertia wheel may have imparted to it a high rate of rotation so that the driving pinion 58 will have a similar high rate of rotation for driving at the corresponding rate, the driven gear 60—see Fig. 4.

Also illustrated in Fig. 4 is a driving sprocket 66 which, as before stated, is connected by the sprocket chain 17 to the rear wheel sprocket 16 for driving the wheel 14. Each plate 30 adjacent and in axial alignment with the hub portion 28 of the standard bicycle frame is provided upon its inner side with an anti-friction construction 67 retained in position by the socket forming and/or retaining collar 68. The anti-friction construction supports the shaft 69 which extends from adjacent one frame member 30 to the opposite frame member 30. Rotatably supported by the shaft 69 is a tubular shaft 70 which is integral with the gear 60—see the right hand portion of Fig. 4—and the same is interposed between the adjacent anti-friction structure 67 and the shaft 69.

Coaxial with said shaft but longitudinally slidable relative to the same is a hub portion 71. It has a spline connection 72 with the shaft. It also has a flange portion 73 provided with brake or clutch-lining 74 to insure better engagement with the clutch face 75 of the gear 60. The opposite end of the hub 71 terminates in a tubular extension 76 which is telescopically associated with one end of a coil spring 77 that normally projects the clutch plate 73 into engagement with the gear 60, driven, as it will be remembered, by the chain 59, in turn driven by the pinion 58, driven by the inertia wheel.

The opposite end of the spring 77 bears on a retaining member 78 rotatably mounted on the shaft and butting against an annular member 79 associated with an annular series of balls 80, the latter being retained in the hub portion 28 of the frame of the bicycle by means of the annular hub reenforcing member 81 as shown.

A cylindrical member 82 having the inwardly directed flange 83 extends inwardly into the groove 84 formed between the two members 78 and 79 at their abutting faces, each being reduced for forming said annular groove. The gear 66 is rigid with the shaft 69.

A brake drum 85, see Fig. 4, has its side portion 86 rigidly secured by pin or like means 87 to the gear 66. A hub 88 of the drum encircles the shaft and thus the shaft constitutes a support for the drum. A brake band 89 may be provided with friction lining 90, or the like. Band 89 is of conventional character and is relatively stationary with reference to the frame, since one end 89a of the band 89 is carried by pin 91a carried by an actuating arm 91, see left hand portion of Fig. 4, pivoted as at 92 upon a support 93 and retained thereon as at 94. The support 93 is rigid with the adjacent plate 30. The operating arm 91 is suitably connected to the cable or cord 26. The other end 89b of the band 89 is suitably supported by the plate 30 as by post 95 extending therefrom and receivable in the cylindrical portion 96 of end 89a of band 89, see Fig. 4. Thus, an upward pull on cord 26 tilts lever arm 91 to force downwardly into drum clamping engagement the brake band 89.

The other cable 25 at 97 emerges from the tubular portion 27 of the bicycle frame and is secured to the free end of lever 98 pivotally supported at 99 on a hub reenforcing collar 100 which encircles one end of the hub 28 of the bicycle frame. It will be noted that both ends of the hub are thus reenforced—see member 81.

The clutch plate 73 has its hub portion 71 provided with a groove 101 in which rides the split clutch collar 102. Said collar includes the twisted aligning fingers 103, the free ends 104 of which are slidably mounted in the grooves 105 in the reenforcing collar 100, suitably anchored to the hub 28 at 106. The hub 28 is apertured as at 107 and extending through the same and through the projecting embossment 108 on the reenforcing collar 100 is a rock shaft 99. The lever arm 98 has an extension 109 at one end of the shaft and the other end of the shaft supports a complementary arm 109a.

Each arm 109 and 109a is pivotally associated as at 110 with a link 111. Each link 111 at its opposite end is pivotally associated with the trunnion 12 of the split clutch collar 102—see Fig. 5. Thus, a pull on the cable 25 through arm 98 rocks shaft 99 which tilts arms 109 and 109a, moving to the left—see Fig. 4—the links 111, in turn moving the clutch collar to the left in opposition to the constraint of spring 77 to free the gear 60 from the shaft 69.

Reference will be had to Figs. 1, 2 and 3. In said figures the numeral 113 indicates a forward closure for the two plates 29 and if desired, the same may be extended downwardly serving as a mud guard as at 114. In order to prevent wabbling and the like, and also to serve as a guard, member 113 is extended upwardly as at 115 and terminates adjacent the tubular portion 27 and is suitably clamped to the tubular portion 27 of the frame as at 116. By reason of the unitary relatively rigid construction shown in Fig. 3 of the attachment and since it is anchored to the frame as at 116 and is furthermore centered and anchored through the hub structure 28 of the frame—see Fig. 4—the attachment is relatively rigidly anchored to the bicycle frame.

To effect the transformation, all that is requisite is to remove the pedal and sprocket construction of the standard bicycle construction and associate the attachment shown more specifically in Figs. 2 to 6, inclusive, and anchor the same as well as at 116 and then apply the control cables 25 and 26 and the operating levers 23 and 24, as shown or as otherwise desired.

The operation of the device is as follows: With the clutch engaged, brake action not only retards the rear wheel of the bicycle or driving wheel, but also retards the inertia wheel. With the clutch disengaged and the brake engaged, the rear wheel of the bicycle only is retarded. With the brake disengaged and the clutch engaged and with the bicycle going down hill, the rear wheel, if the vehicle speed increases by reason of such travel, increases the speed of the inertia wheel. In other words, there is obtained a storing of power derived from the speed of the vehicle. If at any time during such down hill movement, the speed of the bicycle exceeds that desired for safe riding, and it is still desired to retain in the inertia wheel the power previously stored therein, the clutch is disengaged and the brake is engaged, which operation permits the vehicle to thereafter proceed to the bottom of the hill at the desired regulated speed and the inertia wheel to continue its independent rotation, the power dissipated thereby being only that necessary to overcome the friction of the parts. By reason of the overrunning clutch incorporated in the initial pedal drive connection to the inertia wheel, the pedals and all power mechanism between the pedals and the inertia wheel may and will remain stationary, if the pedals are not actuated.

As initially set forth herein, if the brake is engaged and the clutch is disengaged, the bicycle is held stationary and the pedals may be vigorously and repeatedly actuated to impart a high degree of rotation to the inertia wheel and then when the brake is released and the clutch is permitted to engage, the bicycle is moved by the power previously imparted to the inertia wheel and additional power may be continuously imparted for driving the bicycle, or the like, by continued actuation of the pedal structures. If it be assumed that the bicycle has reached the bottom of the hill and is starting up the next incline, the inertia wheel with the clutch engaged and the brake released will dissipate its power to and through the driving wheel of the bicycle for moving the bicycle up hill until such time as the rate of rotation of the inertia wheel is slightly less than the rate of rotation imparted to the inertia wheel by reason of pedal operation.

The invention set forth herein, therefore, is a conservation device as well as a device capable of permitting a bicycle to be started on its initial movement at a relatively high speed and the latter is obtained as before mentioned by imparting to the inertia wheel a very high degree of initial rotation while the bicycle is stationary, while the brake is engaged and the clutch is disengaged.

While the invention has been set forth in considerable detail herein and has been shown applied to a bicycle as a transformation construction, the same is to be considered as illustrative and not restrictive in character for the device may be applied, as stated, to other manually propelled vehicles having a plurality of wheels and may be incorporated therein as a permanent organization or mechanism as distinguished from the transformation form of the invention illustrated.

It will also be readily apparent that various modifications of the invention may be made. For example, in the inertia unit including the power drive thereto from the pedals, and the like, various forms of brake mechanisms and operating sub-combinations therefor, various forms of clutch mechanisms and sub-combinations for operating the same, and all of such variations as readily suggest themselves to persons skilled in this art, are all considered to be within the scope of this invention, reference being had to the appended claims.

The invention claimed is:—

1. In a manually propelled vehicle of the bicycle type including a plurality of wheels, one of which is driven, the combination of a rotatable inertia member having a fixed axis of rotation, manually operable oscillatable means for rotating same, means for direct driving of the driven wheel by the inertia member, and manually operable control means selectively associated with the driving means for the purpose set forth.

2. A device as defined by claim 1, characterized by said control means including a clutch construction and a brake construction.

3. A device as defined by claim 1, characterized by the addition of an overrunning clutch interposed between the first mentioned manually operable means and the rotatable inertia member, said manually operable control means including a clutch construction and a brake construction.

4. In a manually propelled vehicle of the bicycle type including a plurality of wheels, one of which is driven, the combination of a rotatable inertia member having a fixed axis of rotation, manually operable oscillatable means for rotating same, means for driving the driven wheel by the inertia member, and manually operable control means associated with the driving means for the purpose set forth, said control means including a clutch construction.

5. In a manually propelled vehicle of the bicycle type including a plurality of wheels, one of which is driven, the combination of a rotatable inertia member having a fixed axis of rotation, manually operable oscillatable means for rotating same, means for driving the driven wheel by the inertia member, manually operable control means associated with the driving means for the purpose set forth, said control means including a clutch construction, and an overrunning clutch interposed between the first mentioned manually operable means and the rotatable inertia member.

6. An inertia attachment for a standard bicycle including a framework secured to and straddling the bicycle frame hub when the standard sprocket gear and pedals are removed therefrom, pedal means carried by the framework, an inertia member having a fixed axis of rotation nested therein and driven by the pedal means, manually operable control means carried by the framework in coaxial alignment with the frame hub, and a driving gear for the bicycle driven by the inertia member through said control means.

7. A device as defined by claim 6, characterized by a portion of said framework serving as a guard for the inertia member and as a support for anchoring the framework to the bicycle frame remote from the hub thereof.

8. In an inertia device for manually propelled vehicles such as a bicycle, the combination of a pair of relatively independent and oscillatable pedals, a rotatable vehicle propelling inertia member having a fixed axis of rotation, a pair of relatively independent driving members for rotating the inertia member, and a pair of one-way clutches each being between the inertia member and the associated driving member.

9. In an inertia device for manually propelled vehicles such as a bicycle, the combination of an exterior framework, an interior framework, said frameworks being suitably secured together, said frameworks having portions spaced apart providing three operating spaces, a pair of pedal structures positioned exteriorly of the exterior framework and upon opposite sides thereof, a rotatable vehicle propelling inertia member positioned in the intermediate space, shaft means for the inertia member projecting into each exterior space and having a fixed axis of rotation, speed reducing mechanisms in each exterior space operable by the adjacent pedal structure for rotation of the adjacent projecting shaft means, and means operable by the inertia member for driving the vehicle.

10. A device as defined by claim 9, characterized by each pedal structure having an oscillatory movement only, said shaft means being relatively independent, and the addition of a pair of one-way clutches, each interposed between one of the pedal structures and the inertia member.

11. A device as defined by claim 9, characterized by the addition of one-way clutch means interposed between the shaft means and the inertia member.

12. In combination a frame for a manually operable vehicle, a steering post with a wheel rotatively mounted in the front portion of said frame, a shaft transversely supported on the rear end of said frame, a rear wheel rotatively mounted on said shaft, a bearing transversely supported on the front portion of said frame, a driving shaft journaled in said bearing, driving connections between said driving shaft and said rear wheel, pinions on the ends of said driving shaft, freewheeling clutches interposed between said pinions and said driving shaft, pedals on either side of said frame pivotally supported by their rear ends on the rear end of said frame, and independent speed reducing mechanisms between the pedals and the pinions.

13. In combination a frame for a manually operable vehicle, a steering post with a wheel rotatively mounted in the front portion of said frame, a shaft transversely supported on the rear end of said frame, a rear wheel rotatively mounted on said shaft, a bearing transversely supported on the front portion of said frame, a driving shaft journaled in said bearing, driving connections between said driving shaft and said rear wheel, pinions on the ends of said driving shaft, freewheeling clutches interposed between said pinions and said driving shaft, pedals on either side of said frame pivotally supported by their rear ends on the rear end of said frame, independent speed reducing mechanisms between the pedals and the pinions, and an inertia wheel rigid with the driving shaft and between said pinions.

CORWIN S. ALEXANDER.